(12) United States Patent
Kim

(10) Patent No.: US 7,965,918 B2
(45) Date of Patent: Jun. 21, 2011

(54) IMAGE DISPLAY DEVICE AND IMAGE DISPLAY METHOD

(75) Inventor: Yong Chul Kim, Gwangjoo-si (KR)

(73) Assignee: LG Electronics Inc., Seoul (KR)

( * ) Notice: Subject to any disclaimer, the term of this patent is extended or adjusted under 35 U.S.C. 154(b) by 1281 days.

(21) Appl. No.: 11/487,422

(22) Filed: Jul. 17, 2006

(65) Prior Publication Data

US 2007/0014534 A1 Jan. 18, 2007

(30) Foreign Application Priority Data

Jul. 18, 2005 (KR) .................. 10-2005-0064913

(51) Int. Cl.
*H04N 5/932* (2006.01)
(52) U.S. Cl. ...................... 386/219; 386/220
(58) Field of Classification Search .......... 386/46, 386/52, 55, 83, 125, 124, 219, 220, 353, 386/356, 230, 241
See application file for complete search history.

(56) References Cited

U.S. PATENT DOCUMENTS

| | | | |
|---|---|---|---|
| 6,118,493 A | 9/2000 | Duhault et al. | 348/564 |
| 2002/0094191 A1 | 7/2002 | Horie et al. | 386/46 |
| 2004/0098671 A1* | 5/2004 | Graham et al. | 715/527 |
| 2004/0240005 A1 | 12/2004 | Kim | 358/537 |
| 2005/0069283 A1 | 3/2005 | Mitsuyu | 386/46 |
| 2006/0020971 A1* | 1/2006 | Poslinski | 725/44 |
| 2007/0014404 A1* | 1/2007 | Cha | 380/201 |
| 2007/0133607 A1* | 6/2007 | Park | 370/484 |

FOREIGN PATENT DOCUMENTS

| | | |
|---|---|---|
| CN | 1397075 A | 2/2003 |
| CN | 1418430 A | 5/2003 |
| EP | 1 435 619 A2 | 7/2004 |
| EP | 1 465 417 A2 | 10/2004 |
| EP | 1 513 151 A1 | 3/2005 |
| KR | 10-2003-0042121 | 5/2003 |
| WO | WO 01/72035 A2 | 9/2001 |

OTHER PUBLICATIONS

Chinese Office Action dated Jan. 9, 2009.
European Office Acton dated Jul. 16, 2009.
Chinese Office Action dated Sep. 4, 2009.
European Search Report dated Nov. 10, 2006.
Korean Office Action dated Nov. 3, 2006 for Application No. 10-2005-0064913.

* cited by examiner

*Primary Examiner* — Robert Chevalier
(74) *Attorney, Agent, or Firm* — KED & Associates LLP

(57) ABSTRACT

An image display device and an image display method are provided. The image display device includes: a signal processing unit receiving and processing a broadcasting program; a storage unit storing the broadcasting program; an outputting unit decoding and outputting the broadcasting program; and a control unit controlling a progress bar that displays a storing or playing progress state and a thumbnail image of the broadcasting program according to a progressing state to be displayed when the broadcasting program is stored in the storage unit or the broadcasting program stored in the storage unit is played.

24 Claims, 6 Drawing Sheets

IMAGE DISPLAY DEVICE AND IMAGE DISPLAY METHOD

BACKGROUND OF THE INVENTION

1. Field of the Invention

The present invention relates to an image display device and an image display method.

2. Description of the Related Art

Consumers are more and more interested in a digital television using a digital transmission method.

The digital television has functions that record a broadcasting program in real-time and play the recorded broadcasting program at a desired time by using a personal video recorder (PVR) while watching the broadcasting program.

A PVR system is a personal digital video recorder that records and plays information to and from a hard disk. Unlike VCRs that record an image signal on a magnetic tape, the PVR system is a new concept digital recorder that records and plays information to and from a hard disk. That is, the PVR system is a next generation recorder that can record a broadcasting program with a large-sized data through a hard disk drive (HDD) built in a set top box or a television.

However, an image display device using a related art PVR system can not provide a function that allows a user to effectively recognize recording information of a broadcasting program or playing information of the recorded broadcasting program.

SUMMARY OF THE INVENTION

Accordingly, the present invention is directed to an image display device and an image display method that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image display device including: a signal processing unit receiving and processing a broadcasting program; a storage unit storing the broadcasting program; an outputting unit decoding and outputting the broadcasting program; and a control unit controlling a progress bar that displays a storing or playing progress state and a thumbnail image of the broadcasting program according to a progressing state to be displayed when the broadcasting program is stored in the storage unit or the broadcasting program stored in the storage unit is played.

In another aspect of the present invention, there is provided an image display device including: a signal processing unit receiving and progressing a broadcasting program; a storage unit storing the broadcasting program; an outputting unit decoding and outputting the broadcasting program; and a control unit controlling a thumbnail image that is extracted from the broadcasting program to be displayed in a display unit when the broadcasting program is recorded in the storage unit.

In a further another aspect of the present invention, there is provided an image display method including: receiving and recording a broadcasting program in a storage unit; and displaying a thumbnail image of the broadcasting program and a progress bar according to a recording progress state of the broadcasting program.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
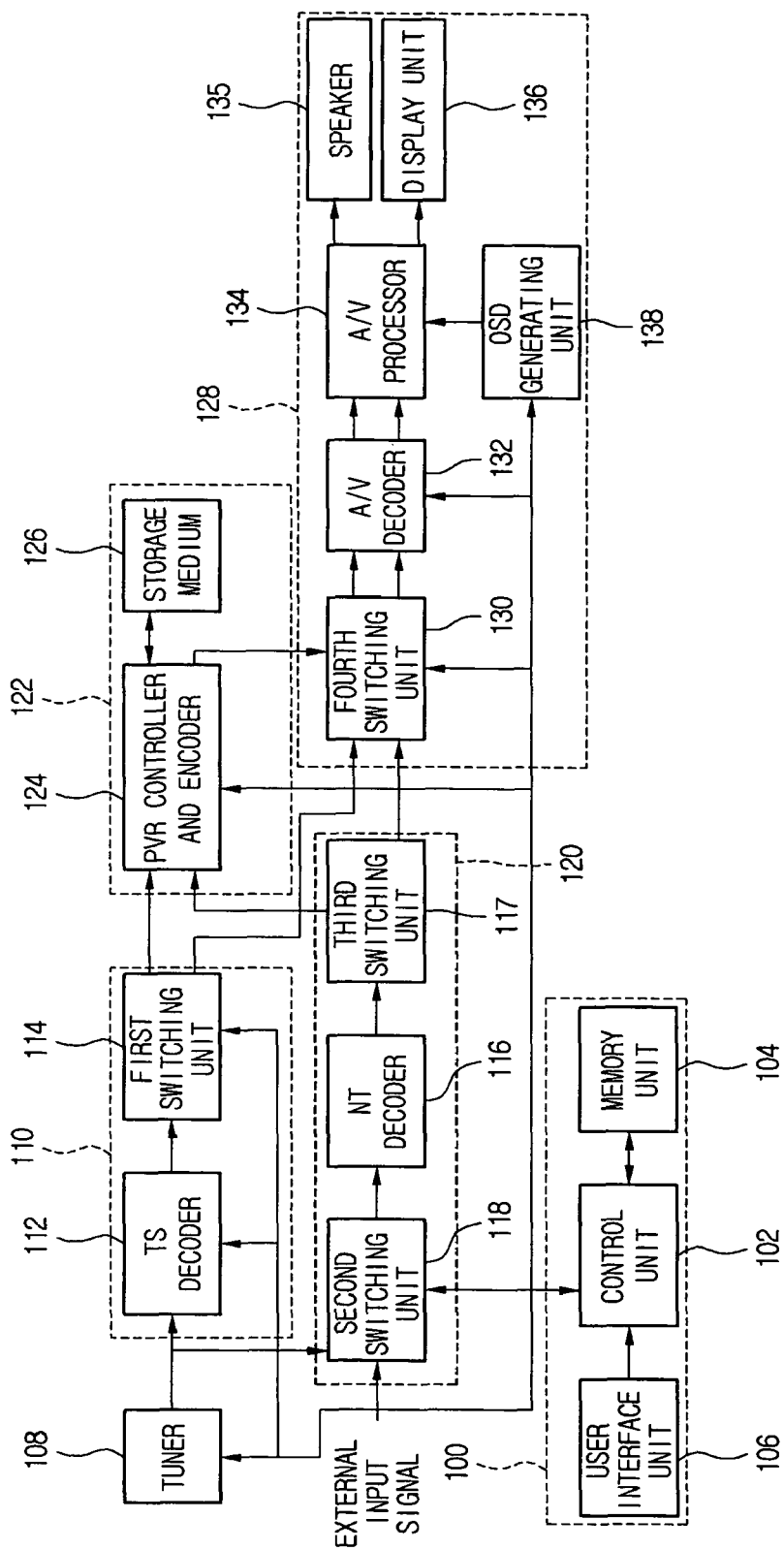
FIG. 1 is a view of a configuration of an image display device.

FIG. 1 is a view of a configuration of an image display device.

Referring to FIG. 1, the image display device includes a command processing unit 100, a tuner 108, a first signal processing unit 110, a second signal processing unit 120, a storage unit 122, and an outputting unit 128. The command processing unit 100 receives and processes commands such as switching a channel, recoding a broadcasting program, plying a recorded broadcasting program, etc. The tuner 108 selects and receives a channel that a user wants in broadcasting signals. The first signal processing unit 110 receives and processes a digital broadcasting signal in the broadcasting signals received through the tuner 108. The second signal processing unit 120 processes an analog broadcasting signal or an external input signal in the broadcasting signals received through the tuner 108. The storage unit 122 stores the broadcasting signals processed in the first signal processing unit 110 and the second signal processing unit 120. Moreover, the outputting unit 128 receives, processes, and outputs the broadcasting signals processed in the first signal processing unit 110 and the second signal processing unit 120, and the broadcasting signals played from the storage unit 122.

The command processing unit 100 includes a user interfacing unit 106 receiving user commands, a control unit 102 records a received broadcasting signal or plays and outputs a recorded broadcasting signal according to the command inputted through the user interfacing unit 106, and a memory unit stores various information such as a user information, a timer recording, etc.

The control unit 102 controls the first signal processing unit 110, the second signal processing unit 120, the storage unit 122, and the outputting unit 128 to manage storing and displaying broadcasting programs as follows.

The first signal processing unit 110 includes a TS decoder 112 receiving and decoding a digital broadcasting signal from the tuner 108, and a first switching unit 114 selectively outputs the signal decoded in the TS decoder 112 into the storage unit 122 and the outputting unit 128 according to a control signal of the controller 102.

Additionally, the second signal processing unit 120 includes a second switching unit 118 selecting an analog broadcasting signal received from the tuner 108, and an external input signal inputted from external devices, an NT decoder 116 decoding the signal switched in the second switching unit 118, and a third switching unit 114 selectively outputting the signal decoded in the NT decoder 116 into the storage unit 122 or the outputting unit 128.

The storage unit 122 includes a PVR controller and an encoder 124 receiving and encoding outputs of the first switching unit 114 or the third switching unit 117, and a storage medium 126 storing the signals encoded in the PVR controller and the encoder 124. The storage medium 126 can be formed of various medium such as a hard disk, non-volatile memory, etc.

The outputting unit 128 includes a fourth switching unit 130 selecting outputs of the first switching unit 114, the second switching unit 117, and the PVR controller and the encoder 124, an AV decoder 132 decoding audio and video signals selected from the fourth switching unit 130, an AV processor 134 processing the signal decoded in the AV decoder 132 to output sound and video, a speaker 135 outputting audio signals processed in the AV processor 134, a display unit 136 outputting a video signals processed in the AV processor 134, and an OSD generating unit 138 generating an OSD screen to select recording and playing conditions that a user want and display recoding and playing state.

The image display device extracts and stores thumbnail images while storing the received broadcasting programs, and displays a progressing state of storing or playing the broadcasting programs with the thumbnail images.

The thumbnail images can be extracted from one of the first signal processing signal 110, the second signal processing signal 120, the PVR controller and the encoder 124, and the AV decoder 132. Then, the extracted thumbnails are stored in the storage medium 126.

The thumbnail image is a representative image that represents a specific interval in a broadcasting program and can be used for summary of a broadcasting program contents, a key frame of video indexing, and a preview of a broadcasting program.

Figure 2:
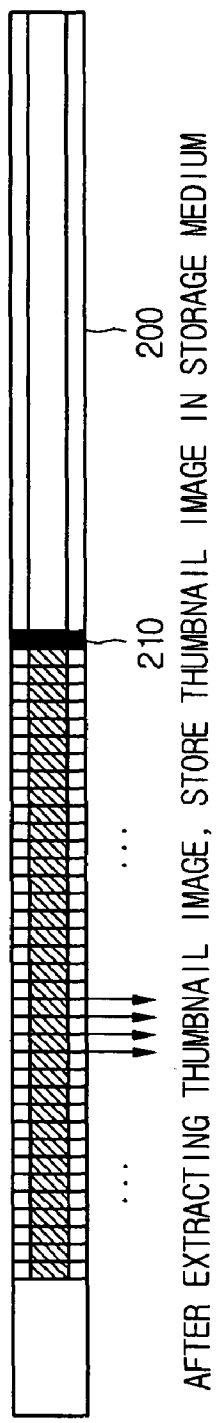
FIG. 2 is a view of a progress bar that displays a progressing state when recording a broadcasting program and playing a recorded broadcasting program in an image display device.

FIG. 2 is a view of a progress bar that displays a progressing state when recording a broadcasting program and playing a recorded broadcasting program in an image display device.

First, the progress bar 200 is generated in the OSD generating unit 138 and is processed with an image signal that will be displayed in the AV processor 134 to be displayed in the display unit 136.

When recording a broadcasting program, the progress bar 200 and an indicator 210 in an appropriate position are displayed referring to broadcasting time information of a broadcasting program. When playing a recoded broadcasting program, the progress bar 200 and the indicator 210 in an appropriate position are displayed referring to playing time information.

On the other hand, when periodically or non-periodically recoding a broadcasting program, thumbnail images are extracted. In FIG. 2, thumbnail images are periodically extracted at a predetermined interval.

Additionally, the position of the indicator 210 can be changed periodically or non-periodically. Thumbnail images can be extracted during moving the position of the indicator 210. The extracted thumbnail images are stored in the storage medium 126.

Figure 3:
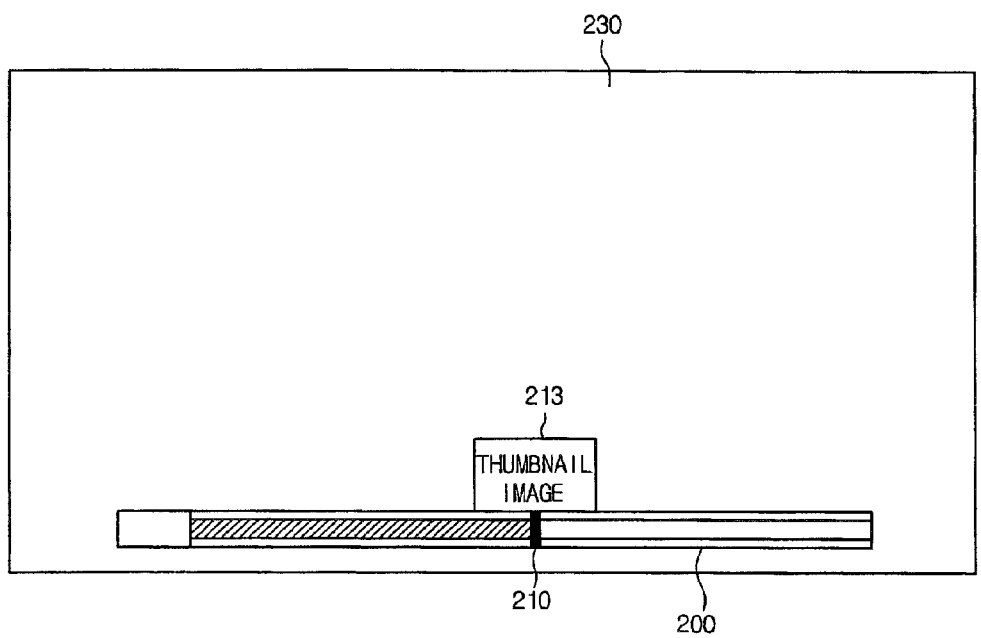
FIG. 3 is a view of when a first image, a thumbnail image, and a progress bar are displayed in an image display device.

FIG. 3 is a view of when a first image, a thumbnail image, and a progress bar are displayed in an image display device.

A first image 230, a progress bar 200, and a thumbnail image 213 are displayed in a screen of the image display device.

When playing a stored broadcasting program, the first image 230 of a broadcasting program in displaying and the thumbnail image 213 are periodically or non-periodically displayed in an identical image. That is, since the thumbnail image 213 is an image extracted from the stored broadcasting program, the first image 230 and the thumbnail image 213 are displayed in an identical image at a specific time.

When watching a broadcasting program while recording it, the first image 230 and the thumbnail image 213 are periodically or non-periodically displayed as an identical image as in the case of playing a stored broadcasting program.

On the other hand, when playing a stored broadcasting program, or watching a broadcasting program during recording the broadcasting program, a command is inputted to move the indicator 210 through the user interfacing unit 106. In this case, a position of the thumbnail image 213 can be changed according to the position change of the indicator 210.

Accordingly, a representative image in an interval that is already played or a representative image in an interval that will be played can be shown. Through this, a user can easily select a specific playing interval. However, it is impossible to select an interval that will be played when receiving and displaying a broadcasting program in real time.

On the other hand, when watching a broadcasting program during recording another broadcasting program, the first image 230 and the thumbnail image 213 are displayed in respectively different images.

That is, in case of watching a broadcasting program in another channel during recording a broadcasting program, a thumbnail image 213 of the broadcasting program in recording, the progress bar 200 displaying a recording progress, and the indicator 210 can be displayed when a command to display recording progressing state is inputted through the user interfacing unit 106.

For example, the first image 230 is a "CNN news" image in watching, and the thumbnail image 213 is a "FRIENDS" image in recording. Additionally, the progress bar 200 and the indicator 210 display a recording state.

Figure 4:
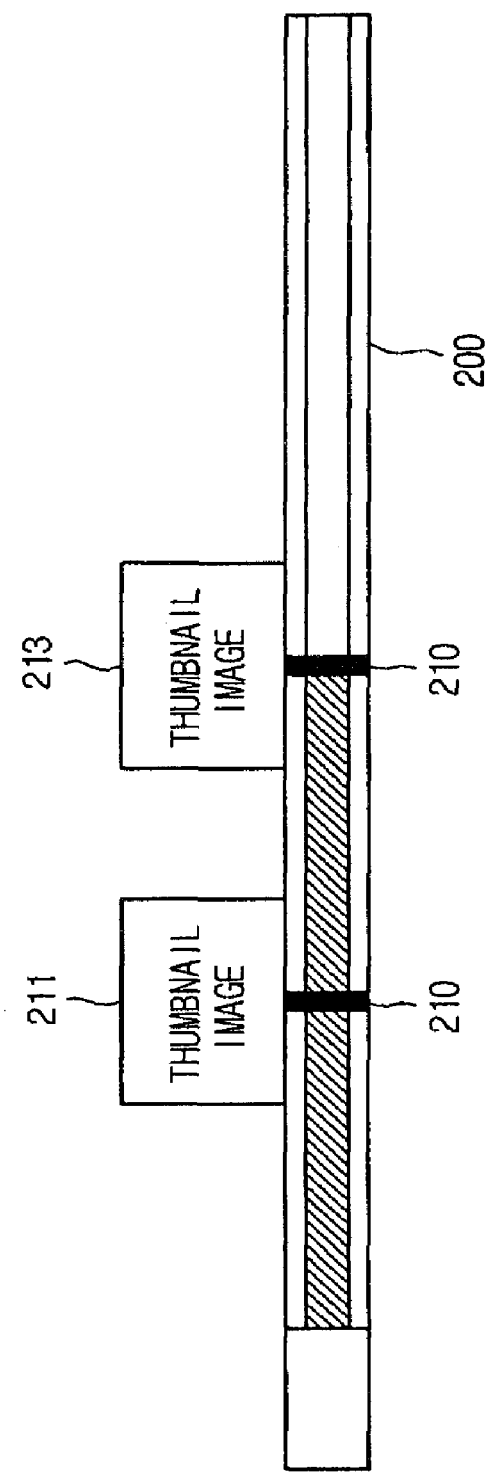
FIGS. 4 and 5 are views of when a thumbnail image and a progress bar are displayed in an image display device.
Figure 5:
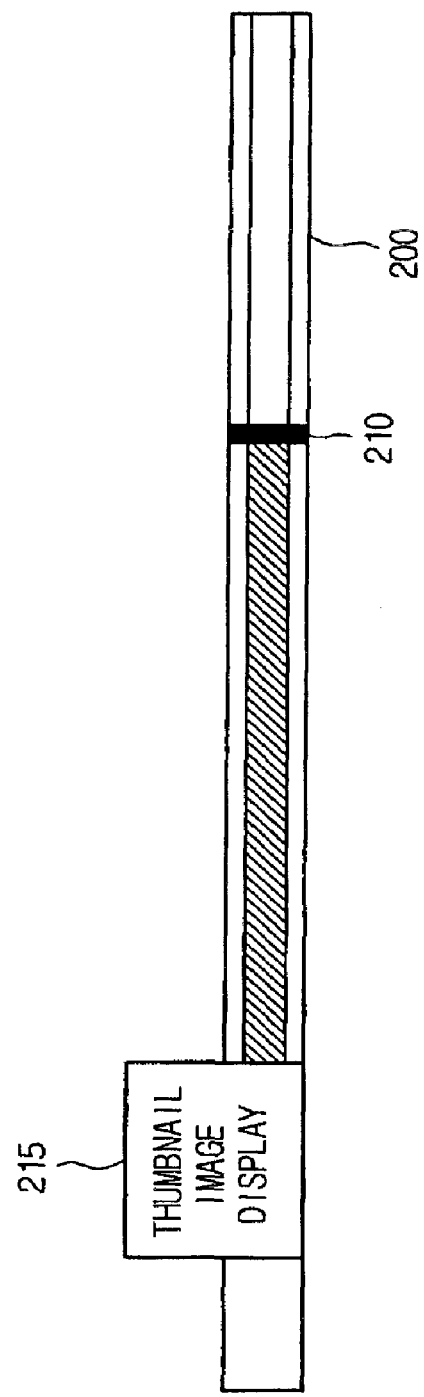

FIGS. 4 and 5 are views of when a thumbnail image and a progress bar are displayed in an image display device.

Referring to FIG. 4, the indicator 210 can be moved according to a signal inputted through the user interfacing unit 106, and also the thumbnail images 211 and 213 are moved according to the indicator 210.

Images displayed in the thumbnail images 211 and 213 are representative images that represent a playing interval where the indicator 210 is located.

Referring to FIG. 5, the thumbnail image 215 is fixed and displayed on one side of the progress bar 200 regardless of the indicator 210 movement.

Likewise, the thumbnail image 215 is a representative image that represents a playing interval where the indicator 210 is located.

Operations of the indicator 210 will be described as follows.

First, the control unit 102 controls the tuner 108 to select a channel according to a power-on command inputted through the user interfacing unit 106.

The broadcasting signal selected through the tuner 108 is inputted into the TS decoder 112, and is divided into audio, video, and broadcasting information to be decoded.

According to a command inputted through the user interfacing unit 106, the image signal decoded in the TS decoder can be stored on the storage medium 126, and thumbnail images can be periodically or non-periodically extracted from the image signal decoded in the TS decoder 112 to be stored in the storage medium 126.

Additionally, the storing of the image signal can include a temporary storing. The temporary storing stores image signal of a predetermined file size or a predetermined time in real time during receiving a broadcasting program. Then, when the size of the images signal exceeds the predetermined file size or the predetermined time, previously stored image signals are erased first, and image signals in receiving are continuously stored.

Moreover, according to a command inputted through the user interfacing unit 106, the progress bar 200 and the thumbnail image 213 are displayed to show recording progress state or a playing progress state of the stored broadcasting program as illustrated in FIG. 3.

Figure 6:
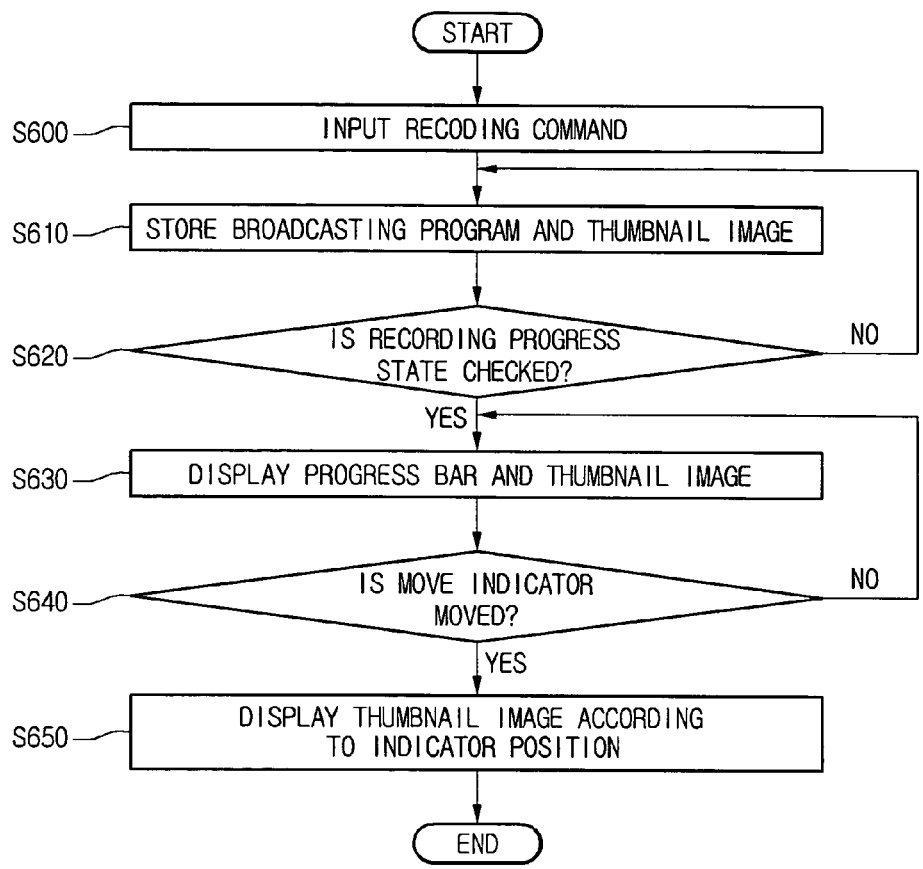
FIG. 6 is a flowchart of an image display device.

FIG. 6 is a flowchart of an image display device.

Referring to FIG. 6, when a recording command is inputted, a selected broadcasting program and thumbnail images extracted from the broadcasting program are stored in operations S600 and S610. The thumbnail images can be extracted periodically or non-periodically and also can be used for a representative image that representing a playing interval of the broadcasting program in recording.

Additionally, the storing of the broadcasting program can include a temporary storing. The temporary storing stores an image signal of a predetermined file size or a predetermined time in real time during receiving a broadcasting program. Then, when the size of the images signal exceeds the predetermined file size or the predetermined time, previously stored image signals are erased first, and image signals in receiving are continuously stored.

In operations S620 and S630, a progress bar and a thumbnail image are displayed according to a command for confirming a recording progress state or the recording command.

At this point, the thumbnail images are images extracted from a playing interval where an indicator of the progress bar is located. Moreover, the progress bar and the thumbnail image can be displayed when watching a broadcasting program during recording another broadcasting program.

On the other hand, when the indicator position is changed according to the recording progress state or a moving command, the thumbnail image at an interval where the indicator is located is displayed in operations S640 and S650.

According to the present invention, the image display device displays the progress bar showing a recording progress state or a playing progress state, and also thumbnails in an area where the indicator is displayed. Therefore, a user can easily recognize a recording progress state and a playing progress state.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image display device comprising:
   a signal processing unit receiving and processing a broadcasting program;
   a storage unit storing the broadcasting program;
   an outputting unit decoding and outputting the broadcasting program; and
   a control unit controlling a thumbnail image that is extracted from the broadcasting program to be displayed in a display unit when the broadcasting program is recorded in the storage unit, wherein the control unit displays a thumbnail image of a broadcasting program in another channel and a thumbnail image of a broadcasting program that is being recorded according to an inputted command.

2. The image display device according to claim 1, wherein the control unit controls the thumbnail image and a progress bar that shows a recording progress state of the broadcasting program that is being recorded to be displayed.

3. A method for controlling an image display device, comprising:
   receiving a video signal;
   decoding the video signal;
   displaying a video corresponding to the decoded video signal on a display of the image display device;
   displaying a progress bar overlaid on the video displayed on the display, wherein thumbnail images based on the video are associated at prescribed locations of the progress bar; and
   displaying at least one corresponding thumbnail image of the video at a prescribed area of the display, wherein the prescribed area is above the progress bar.

4. The method of claim 3, wherein the prescribed area is adjacent to a prescribed location selected on the progress bar.

5. The method of claim 3, wherein the corresponding thumbnail image is displayed based on corresponding location on the progress bar.

6. The method of claim 3, wherein an indicator is provided on the progress bar to indicate the corresponding location on the progress bar.

7. The method of claim 3, wherein the thumbnail images are stored in a storage medium.

8. The method of claim 7, wherein the decoded video signal is stored in the storage medium.

9. The method of claim 3, wherein the corresponding thumbnail image is displayed during playback of the stored video signal.

10. The method of claim 3, wherein the progress bar provides playtime information of the video, and the corresponding thumbnail image corresponds to a prescribed time within the playtime information of the video.

11. The method of claim 3, wherein a prescribed location on the progress bar is selected by a user based on the corresponding thumbnail image, which is one of a plurality of representative images within the video.

12. The method of claim 6, wherein the location of the prescribed area remains fixed regardless of a change in position of the indicator.

13. The method of claim 6, wherein based on the thumbnail image, a corresponding video at the prescribed time within a playtime of the video is displayed on the display.

14. An image display device comprising:
   at least one input to receive a video signal;
   at least one decoder to decode the video signal; and
   at least controller to display a progress bar overlaid on a video based on the video signal on a display, and to display at least one corresponding thumbnail image of the video at a prescribed area of the display, wherein the thumbnail images based on the video are associated at prescribed locations of the progress bar and the prescribed area is above the progress bar.

15. The device of claim 14, wherein the progress bar provides playtime information of the video, and the corresponding thumbnail image corresponds to a prescribed time within the playtime information of the video.

16. The device of claim 14, wherein the prescribed area is adjacent to a prescribed location selected on the progress bar.

17. The device of claim 14, wherein an indicator is provided on the progress bar to indicate the corresponding location on the progress bar.

18. The device of claim 17, wherein the location of the prescribed area remains fixed regardless of a change in position of the indicator.

19. The device of claim 14, further comprising a storage medium to store the at least one thumbnail image.

20. The device of claim 19, wherein the decoded video signal is stored in the storage medium.

21. The device of claim 20, wherein at least one thumbnail image is configured for display during playback of the stored video signal.

22. The device of claim 17, wherein based on the thumbnail image, a corresponding video at the prescribed time within a playtime of the video is displayed on the display.

23. The method of claim 11, wherein the plurality of representative images are periodic or non-periodic within the video.

24. The device of claim 14, wherein the corresponding thumbnail image is displayed based on corresponding location on the progress bar.

* * * * *